Nov. 25, 1952 R. B. BUCHANAN 2,619,549

TOLL SUPERVISORY OPERATOR'S TELEPHONE CIRCUIT

Filed Dec. 29, 1948 4 Sheets-Sheet 1

INVENTOR
R. B. BUCHANAN
BY
R. O. Covell
ATTORNEY

INVENTOR
R. B. BUCHANAN
BY
R. O. Covell
ATTORNEY

Nov. 25, 1952 R. B. BUCHANAN 2,619,549

TOLL SUPERVISORY OPERATOR'S TELEPHONE CIRCUIT

Filed Dec. 29, 1948 4 Sheets-Sheet 3

INVENTOR
R. B. BUCHANAN
BY
R. O. Covell
ATTORNEY

INVENTOR
R. B. BUCHANAN
BY
R. O. Covell
ATTORNEY

UNITED STATES PATENT OFFICE 2,619,549

TOLL SUPERVISORY OPERATOR'S TELEPHONE CIRCUIT

Russell B. Buchanan, Lynbrook, N. Y., assignor to Bell Telephone Laboratories, Incorporated, New York, N. Y., a corporation of New York Application December 29, 1948, Serial No. 67,867

4 Claims. (Cl. 179—27)

This invention relates to semiautomatic telephone systems and particularly to such systems in which dial systems A and B operator positions are provided at a toll switchboard.

Objects of the invention are the improvement of supervisory operator circuits at dial systems B switchboards to render the supervisor circuit accessible in common to dial systems subscribers and to dial systems A and B operators.

According to this invention, a supervisory operator's circuit is arranged to be accessible alternately over each of two lines incoming from the switches of a cross bar dial office and to be accessible from dial systems A and B operator positions of a toll switchboard, preference being given to calls incoming over the lines from the dial office.

A clear and complete description of the invention will be facilitated by describing a telephone system in which the invention and its features are embodied, one such system being shown schematically in the accompanying drawing which consists of Figs. 1 to 4 arranged according to Fig. 5.

Referring to the drawing.

Figure 1:
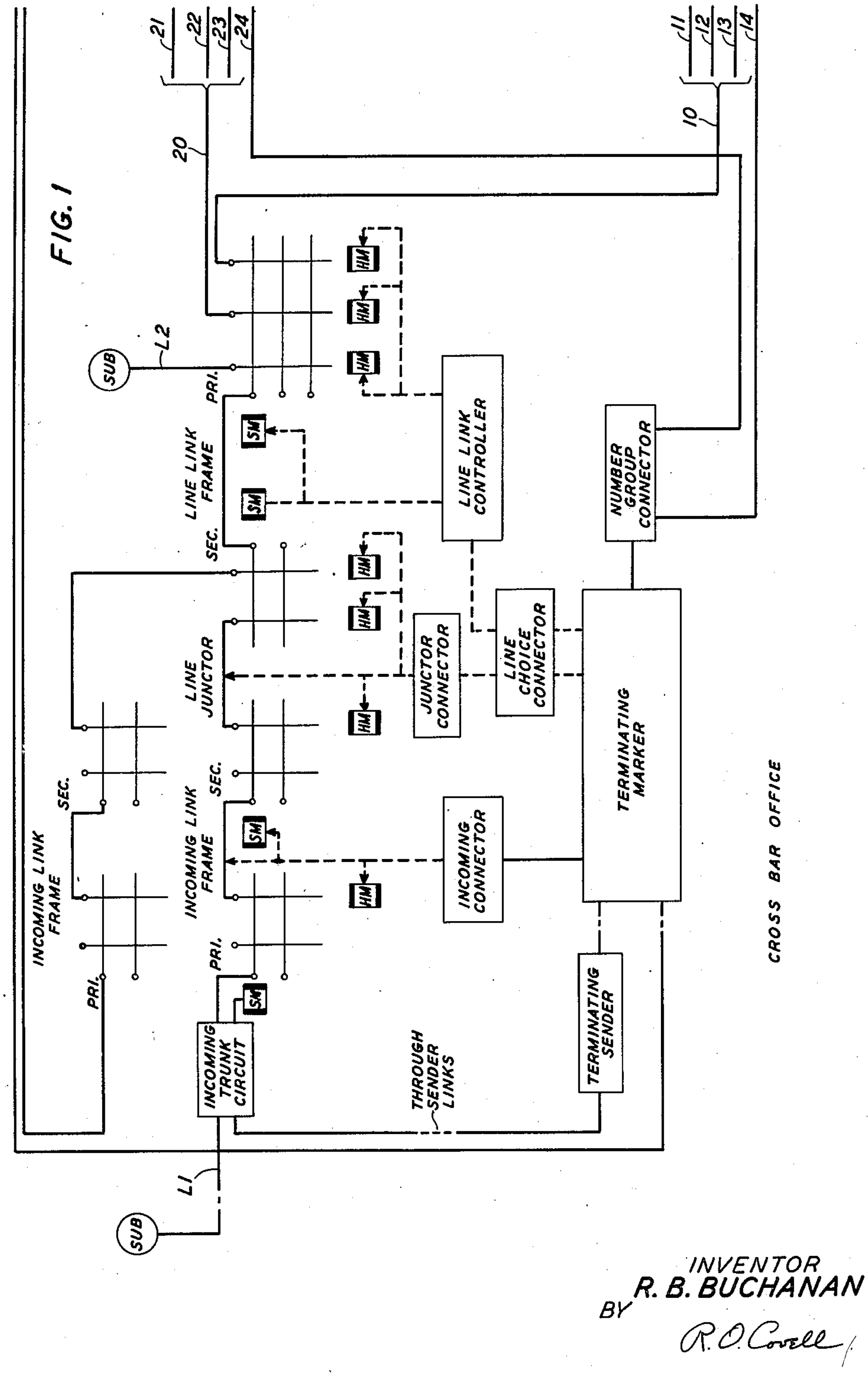
Fig. 1 represents a cross bar dial office.

The equipment in the cross bar office represented in Fig. 1 is similar to that disclosed in Patents 2,089,921 and 2,235,803 granted August 10, 1937, and March 18, 1941, respectively, to W. W. Carpenter. Two subscriber lines L1 and L2 are shown, the line L1 being shown as a calling line and the line L2 as a called line; and two lines 10 and 20 are shown for extending calls to the dial system B switchboard supervisor's circuit shown in Figs. 2 and 3. The dial system B operator position, keyset, sender, link and incoming trunk circuits shown schematically in Fig. 4 are similar to those disclosed in Patents 2,259,100 granted October 14, 1941, to J. F. Dahl and Patent 2,259,101 granted October 14, 1941, to R. C. Davis, J. B. Newsom and W. B. Strickler. The dial systems A operator positions and the distant toll board positions of Fig. 4 may be similar to those disclosed in Patent 2,276,515 granted March 17, 1942, to T. D. Robb and Patent 1,675,956 granted July 3, 1928, to L. F. Porter.

Figure 2:
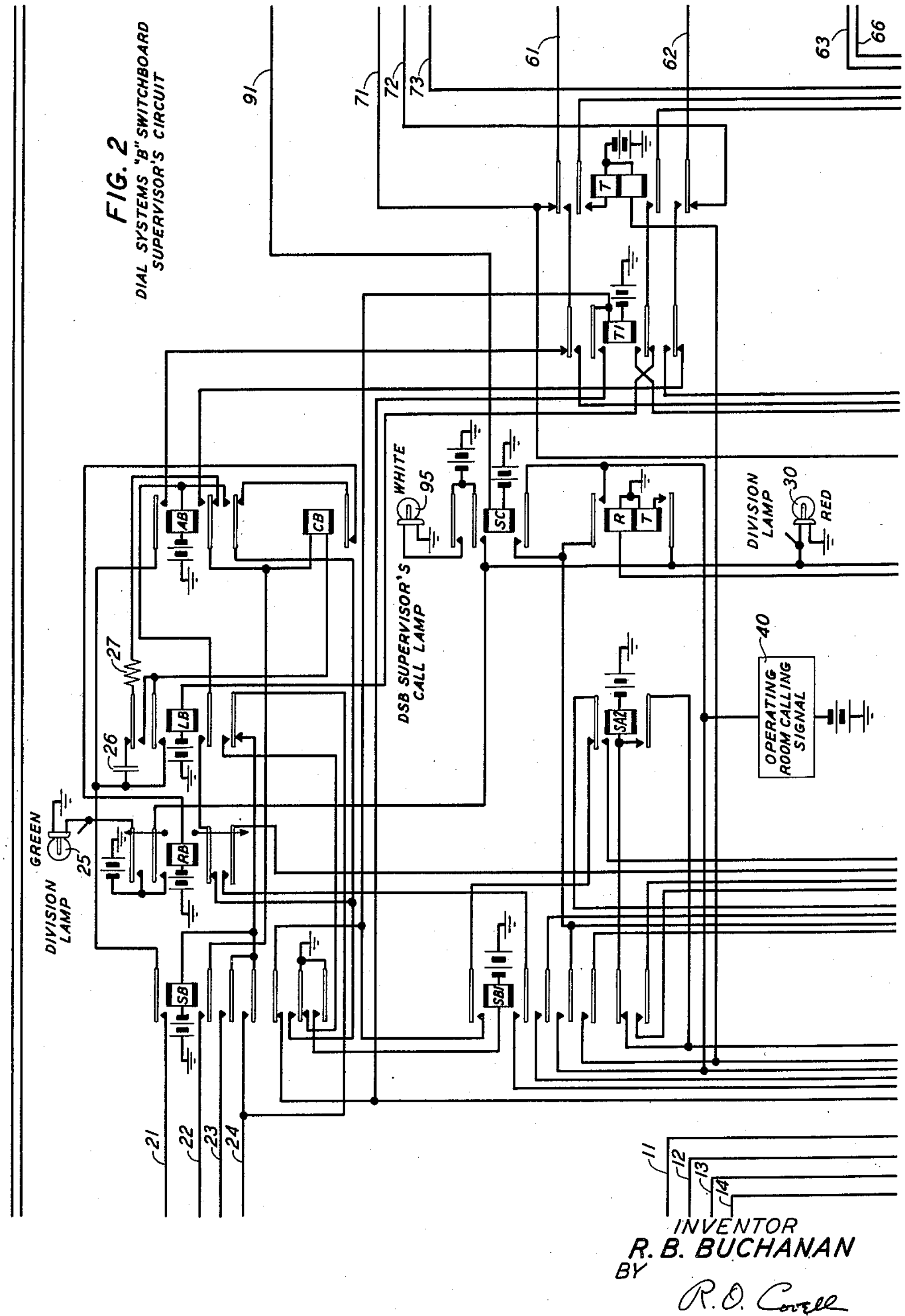
Figs. 2, 3 and 4 represent a toll board comprising A and B operator positions, a supervisory operator circuit and telephone set, and a distant toll board arranged to route calls to the dial system B operator positions.
Figure 3:
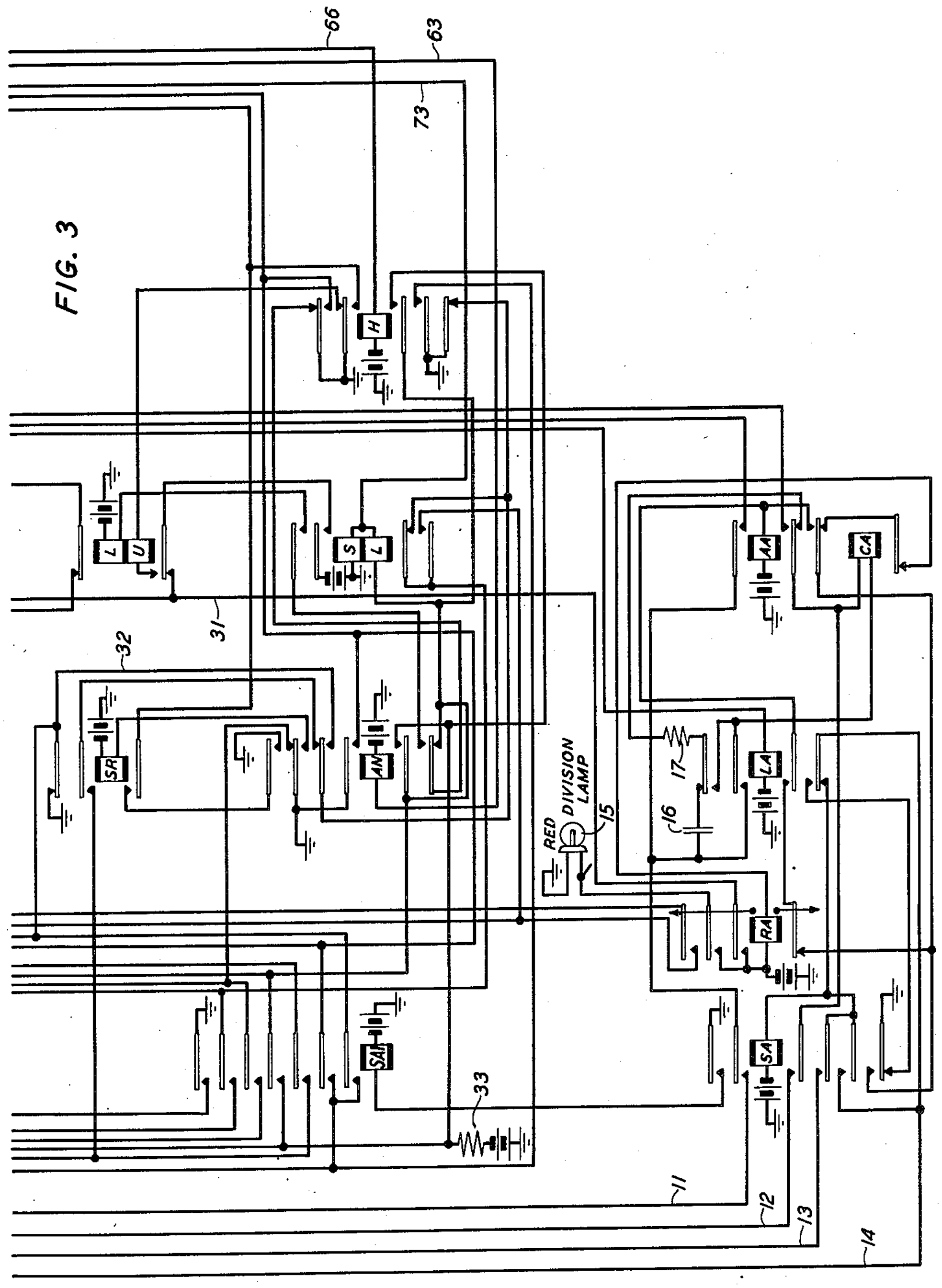
Figures 4, 5:
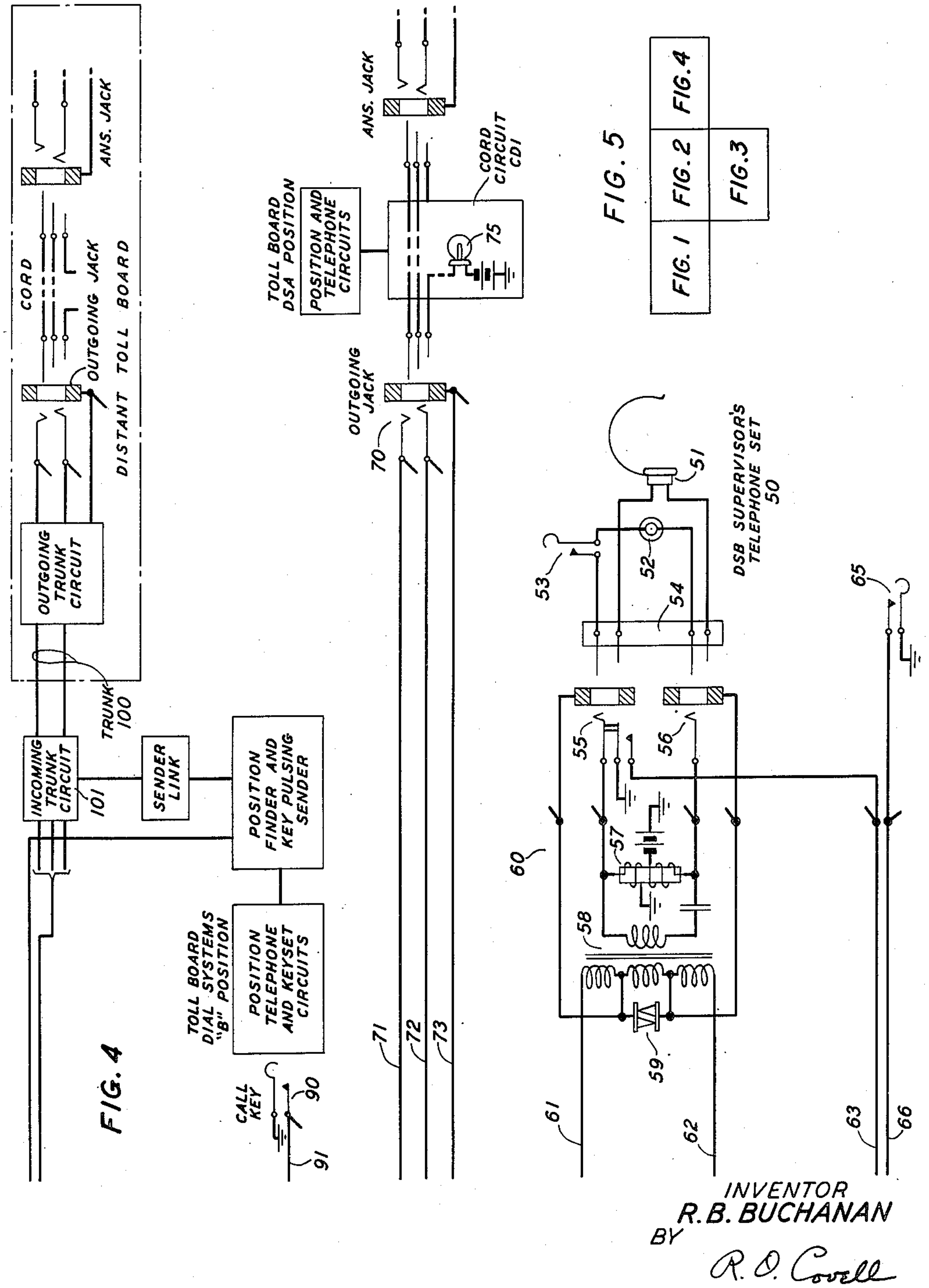

The supervisor's circuit disclosed in detail in Figs. 2, 3 and 4 comprises incoming conductors 11, 12, 13 and 14 of line 10 and associated call lamps 15 and relays SA, SA1, SA2, RA, LA, AA and CA; incoming conductors 21, 22, 23 and 24 of line 20 and associated call lamps 25 and relays SB, SB1, RB, LB; incoming conductors 71, 72 and 73 from DSA positions of a toll board and an associated relay SL; a call key 90 at each DSB operator position and an associated relay SC and call lamp 95 for use in calling a supervisor; a supervisor's telephone circuit 60 jack-ended at each DSB position, a plug-ended telephone set 50 for connection at any DSB position with the telephone circuit 60, and relays AN and SR, which are operated whenever the telephone set is plugged in at any position; a holding key 65 at each DSB position and an associated relay H for holding an incoming call after the telephone set is disconnected at a DSB position; and control relays LU, RT, T1 and T. The supervisor's telephone set includes a receiver 51, transmitter 52, a push-to-talk key 53 and plugs 54 which cooperate with jacks 55 and 56 to connect the telephone set for use. Talking battery is supplied to transmitter 52 through the windings of retard coil 57 and speech currents generated in the transmitter are transmitted through the windings of repeating coil 58 and conductors 61 and 62 to a calling line or operator. Speech currents incoming over conductors 61 and 62 actuate the receiver 51, the volume being limited by thermistor 59.

Assume first that a DSA operator of the toll board calls the DSB supervisor by inserting the plug of a cord CD1 in the outgoing jack 70 to which conductors 71, 72 and 73 are connected; whereby battery is connected through the sleeve conductors of the plug and jack 70 and conductor 73 to energize both windings of relay SL and operate this relay. With the talking key (not shown) of cord CD1 operated, battery in the position circuit is connected to conductors 71 and 72 and from conductor 71 through a back contact of relay LU to the upper winding of relay RT; but relay RT is marginal and does not operate until the ringing key (not shown) of cord CD1 is operated. The operation of relay SL connects battery through the lower back contact of relay LU to conductor 31 thereby lighting the red call lamp 30 in each division of the DSB board. When the calling DSA operator operates the ringing key of cord CD1, the voltage applied to conductor 71 is increased to effect the operation of relay RT. Relay RT closes a locking circuit through its lower winding and conductor 31 so as to be held operated after the ringing key of cord circuit CD1 is released, With relay RT operated, a circuit is closed for energizing the operating room calling signal 40. When the call is answered by the connection of a supervisor's telephone set 50 to telephone circuit 60 at one of the DSB positions, the connection of ground to conductor 63 operatively energizes the winding of relay AN. The operation of relay AN opens the circuit for energizing the operating room calling signal, closes a circuit for operating relay SR, and closes a circuit for operatively energizing the upper winding of relay LU. Relay AN also disconnects ground from the lower, low resistance winding of relay SL and connects battery through resistor 33 to this winding of relay SL thereby to extinguish the supervisory lamp 75 of cord CD1. The operation of relay LU closes a locking circuit through its lower winding under the control of relays SL and H, opens the circuit for energizing lamp 30, disconnects the upper winding of relay RT from conductor 71 and opens the locking circuit of relay RT. The talking connection between the calling DSA operator and the answering supervisory operator includes conductors 71 and 72, back contacts of relay T and conductors 61 and 62. When the DSA operator withdraws the plug of cord CD1 from jack 70, relays SL and LU release in succession; and when the supervisory operator disconnects her telephone set 50 from position jacks 55 and 56, relays AN and SR release in succession.

Assume next that an operator at a distant toll board calls the number assigned to lines 10 and 20 and that the call is completed by a DSB operator in the manner described in the above-mentioned patents through trunk 100, incoming trunk circuit 101, and primary and secondary switches of incoming link and line link frames. Upon seizure of line 10 under control of the terminating marker, ground is connected to conductor 14 thereby operating relay SA of the supervisor circuit. The operation of relay SA closes circuits for operating relays SA1 and RA; connects conductor 14 to the line sleeve conductor 13 to operate the line hold magnet of the primary switch on the line link frame; connects the winding of relay SA directly to conductor 14 independent of relay LA; and bridges condenser 16 and resistor 17 in series across conductors 11 and 12 to satisfy the line continuity test which is made by the terminating marker. The operation of relay RA lights the red call signal division lamps 15 and 30; and the operation of relay SA1 closes a circuit for energizing the operating room calling signal 40. The operation of relay SA1 connects battery through resistor 33 to the lower winding of relay SL to mark the supervisor circuit busy at outgoing trunk jacks 70 at the toll board DSA and toll positions; and closes circuits for operating relays SA2, T and T1. The operation of relay SA2 closes a locking circuit independent of relay SB1 under the sole control of relay SA1. The operation of relay T closes a locking circuit under control of relays SA1 and SR. The operation of relay T1 closes a locking circuit independent of relay SB under the control of relays SA1 and SR. When a supervisor's telephone set 50 is connected to position jacks 55 and 56 to answer the call, the connection of ground to conductor 63 operates relay AN. The operation of relay AN closes the circuit for operating relay SR; closes an additional circuit path from battery through resistor 33 to the lower winding of relay SL; opens the circuit for energizing the operating room calling signal 40; and connects ground at the lowermost back contact of relay H to conductor 32 to hold relays T and T1 operated after relay SR operates. The operation of relay SR completes a circuit including front contacts of relays T, T1 and AN for operating relay LA. The operation of relay LA opens the connection between condenser 16 and resistor 17; bridges resistor 17 across conductors 11 and 12 to effect the operation of a ringing trip relay (not shown) of the incoming trunk circuit 101 in usual manner to terminate the transmission of ringing current over these conductors of line 10; and connects the winding of relay CA in parallel with resistor 17, whereby relay CA is operated. The operation of relay CA causes the release of relay RA, but relay RA is slow in releasing to insure operation of the ringing trip relay. After ringing has been tripped, relay CA is held operated in series with the battery feed relay (not shown) of incoming trunk circuit 101. The release of relay RA extinguishes division lamps 15 and 30; and closes a circuit for operating relay AA. Relay AA closes a locking circuit which is under the control of relay SA; and completes a talking connection between line conductors 11 and 12, through front contacts of relays SA, AA, T1 and T, and conductors 61 and 62 to the telephone circuit 60 and answering supervisor's telephone set 50. The operation of relay AA prevents the reoperation of relay RA in case the supervisor disconnects the telephone set 50 before the calling toll operator disconnects. When the calling operator disconnects, the incoming and line link switches are released and all of the relays in the supervisor circuit release except relays AN and SR. When the supervisor's telephone set 50 is disconnected from position jacks 55 and 56, relays AN and SR release in succession.

Assume next that a call from a toll operator is routed through the cross bar switches to line 20. In this event relay SB is operated upon connection of ground to conductor 24 under control of the terminating marker. The operation of relay SB closes circuits for operating relays SB1 and RB; connects conductor 24 to the line sleeve conductor 23 to operate the line hold magnet of the primary switch on the line link frame; connects the winding of relay SB directly to conductor 24 independent of relay LB; and bridges condenser 26 and resistor 27 in series across conductors 21 and 22 to satisfy the line continuity test which is made by the terminating marker. The operation of relay RB lights the green call signal division lamps 25 and the red call signal lamps 30; and the operation of relay SB1 closes a circuit for energizing the operating room calling signal 40. The operation of relay SB1 connects battery through resistor 33 to the lower winding of relay SL to mark the supervisory circuit busy at outgoing trunk jacks 70 at the toll board DSA and toll positions; and closes a circuit for operating relay T, but does not close a circuit for operating relay T1. The operation of relay T closes a locking circuit for this relay under control of relays SB1 and SR. When a supervisor's telephone set 50 is connected to position jacks 55 and 56 to answer the call, the connection of ground to conductor 63 operates relay AN. The operation of relay AN closes the circuit for operating relay SR; closes an additional path between battery through resistor 33 to the lower winding of relay SL; opens the circuit for energizing the operating room calling signal 40; and connects ground at the lowermost back contact of relay H to conductor 32 to hold relay T operated after relay SR operates. The operation of relay SR completes a circuit including front contacts of relays T and AN and a back contact of relay T1 for operating relay LB. The operation of relay LB opens the connection between condenser 26 and resistor 27; bridges resistor 27 across conductors 21 and 22 to effect the operation of the ringing trip relay (not shown) of trunk circuit 101 in usual manner to terminate the transmission of ringing current over these conductors of line 20; and connects the winding of relay CB in parallel with resistor 27, whereby relay CB is operated. The operation of relay CB causes the release of relay RB, but relay RB is slow in releasing to insure operation of the ringing trip relay. After ringing has been tripped, relay CB is held operated in series with the battery feed relay (not shown) of the incoming trunk circuit 101. The release of relay RB extinguishes division lamps 25 and 30; and closes a circuit for operating relay AB. Relay AB closes a locking circuit which is under control of relay SB, and completes a talking connection between line conductors 21 and 22, through front contacts of relays SB and AB, back contacts of relay T1, front contacts of relay T, and conductors 61 and 62 to the telephone circuit 60 and answering supervisor's telephone set 50. The operation of relay AB prevents the reoperation of relay RB in case the supervisor disconnects before the calling toll operator disconnects. When the calling operator disconnects, all of the relays in the supervisor circuit release except relays AN and SR. When the supervisor's telephone set 50 is disconnected from position jacks 55 and 56, relays AN and SR release in succession.

When it is necessary for a supervisor to hold an incoming connection while answering another connection, one of the hold keys 65 in the division is operated, thereby connecting ground to conductor 66 to operate relay H. When the telephone set 50 is disconnected from the division jacks 55 and 56, relays AN and SR release. If the call being held is a call incoming over line 20, the operation of relay H closes a circuit for holding relay T operated. If the call being held is a call incoming over line 10, the operation of relay H closes circuits for holding both of relays T and T1 operated. If the call being held is one incoming from a DSA operator, the operation of relay H prevents the operation of relay T in case a call comes in over either one of lines 10 and 20 while relay H is operated; both the operating and locking circuits of relay LU are opened and relay LU releases; relay H maintains the connection of battery through resistor 33 to the lower winding of relay SL so as to continue the deenergization of the supervisory lamp 75 in the cord circuit at the toll position. When the telephone set 50 is reconnected to jacks 55 and 56, relays AN, SR and LU reoperate; and, when the hold key is restored to normal, relay H releases.

If on a call from a DSA operator position, the calling operator disconnects before the supervisory disconnects, relay SL releases but relays AN and SR remain operated. With relay AN operated, the connection of battery through resistor 33, lower winding of relay SL and conductor 73 to the sleeve conductors of jacks 70 is maintained as a busy indication to any operator who may attempt to call the supervisor at this time. If on a call from a DSA operator position, the calling operator disconnects while the holding key 65 is operated, relays AN and SR release but relay H maintains the connection of battery through resistor 33, lower winding of relay SL and conductor 73 to the sleeve conductors of jacks 70 as a busy indication.

If, on a call incoming over trunk 100 from a distant toll board to line 10, the calling toll operator disconnects while a hold key 65 is operated, the cross bar switches are released causing the release of relays SA, SA1, SA2, AA, and CA but relays T, T1 and LA remain operated under the control of relay H. With relay SA released and relay LA operated, ground is connected to conductor 14 to mark the line 10 busy. When the hold key 65 is restored to normal after the telephone set 50 has been reconnected to jacks 55 and 56, relays AN and SR are operated and relay H releases. The release of relay H causes the release of relays T1 and LA; but relay T is held operated under control of relay AN until the supervisor again disconnects telephone set 50 from jacks 55 and 56. The release of relay LA disconnects the busy ground potential from conductor 14.

If, on a call incoming over trunk 100 from a distant toll operator to line 20, the calling toll operator disconnects while the supervisor's telephone set is connected to jacks 55 and 56 or while a hold key 65 is operated, the cross bar switches are released causing the release of relays SB, SB1, AB and CB; but relays T and LB are held operated under control of relays AN and SR or under the control of relay H as the case may be. With relay SB released and relay LB operated, ground is connected to conductor 24 to mark line 20 busy. When the telephone set 50 is disconnected from jacks 55 and 56 and key 65 is restored to normal, relays AN, SR and H are released and relays T and LB release. The release of relay LB disconnects busy ground potential from conductor 24.

When nearly simultaneous calls are received on lines 10 and 20, the supervisor's circuit operates to extend the calls to an answering supervisor in the order in which they are received. When a call from a toll board DSA operator is initiated at a time when no calls over lines 10 and 20 are awaiting answer and calls come in over either or both of lines 10 and 20 before the supervisor connects telephone set 50 to jacks 55 and 56, the call from the toll operator will be answered first; and, after this call has been answered, the calls from lines 10 and 20 will be answered in the order received. No calls should be received from DSA operators while there is a call on either of lines 10 and 20 because the sleeves of outgoing jacks 70 are marked busy by the connection of battery potential thereto and the supervisor's circuit does not give preference to calls from operators if a cord is connected to a jack while it is marked busy. The supervisor is automatically connected to the next call by disconnecting and reconnecting the telephone set to plugs 55 and 56; and this action is independent of whether the calling operator disconnects at the time the supervisor disconnects.

Assume that a first call is received over line 10 and that immediately thereafter a call is received over line 20. In this case relays SA, SA1, SA2, RA, T and T1 operate responsive to the call over line 10; and relays SB, SB1 and RB operate responsive to the call over line 20. When a supervisor's telephone set 50 is connected to jacks 55 and 56, relays AN, SR and LA operate as hereinbefore described; and relay LB will be prevented from operating due to the operation of relay T1. With relays AN, SR and LA operated, relays CA, RA and AA function as hereinbefore described and line conductors 10 and 11 are connected through conductors 61 and 62 to the telephone circuit 60. At this time, relays SA, SA1, SA2, AA, CA, LA, T, T1, AN, SR, SB, SB1 and RB are operated and relay RA has released. At the end of the conversation over line 10, the supervisor's telephone set 50 is disconnected from, and then reconnected to, jacks 55 and 56; whereby relays AN and SR are released and then reoperated. If, at this time, the calling operator has not disconnected, relays SA, SA1 and SA2 remain operated and the release of relay AN causes the release of relay T1 due to the fact that relay SR is slow in releasing and ground is disconnected from conductor 32 during the release time of relay SR; and the locking circuit of relay T is opened during the release time of relay SR, so that relay T releases. The release of relay AN causes the release of relay LA and the release of relay SR reconnects ground to conductor 32. When relays AN and SR reoperate, relay T reoperates but the operating circuit of relay T1 is held open due to the operation of both of relays SB and SA2.

Since lines 10 and 20 are assigned the same number and constitute a line group similar to a private branch exchange group, calls waiting on both lines 70 and 20 with the first of the two waiting calls received on line 20 can occur only when a preceding call over line 10 is answered and then released and a new call received over line 10 before the call on line 20 is answered. Under this condition, relays SB, SB1 and RB are operated upon seizure of line 20 and relays SA, SA1 and RA are reoperated upon reseizure of line 10; but relay SA2 cannot reoperate because its operating circuit is opened by the operation of relay SB1. Relay T remains operated when the preceding call from line 10 is released; but relay T1 releases when relay AN releases and cannot reoperate since relay SA2 is not operated. When relay SR reoperates, relay LB operates. After the conversation over line 20 is completed, the supervisor again disconnects and reconnects the telephone set to jacks 55 and 56. When relay AN releases and until slow-to-release relay SR also releases, a circuit is closed for operating relay T1, this circuit including the upper front contact of relay SB1, back contact of relay SA2, front contacts of relays SA1 and SR, inner upper back contact of relay AN to ground at a back contact of relay H. When relay SR releases, ground is reconnected to conductor 32 to lock relay T1. Relay T is held operated since relay SA1 is operated; and when relays AN and SR reoperate, relay T locks and relay LA operates followed by the operation of relay CA, the release of relay RA, and the operation of relay AA as hereinbefore described.

If a first call from a DSA operator is waiting together with a call over line 10, relay SL is operated and relays SA, SA1, SA2 and T1 operate. Relay T cannot operate because its operating circuit is opened by the operation of relay SL; and therefore relay LA cannot operate. When a supervisor connects a telephone set to jacks 55 and 56, relays AN and SR operate and a talking connection is completed between the calling DSA operator and the supervisor. When the supervisor disconnects, relays AN and SR release. If the DSA operator fails to disconnect, the circuit for operating relay T is closed by the release of relay AN while relay SR is releasing.

When relay SR releases, the locking circuit of relay T is closed. When the supervisor reconnects the telephone set to jacks 55 and 56, relays AN and SR reoperate and relay LA operates, and the call incoming over line 10 is completed to the supervisor as hereinbefore described.

If a DSB operator wishes to obtain the assistance of a supervisor, the operation of a call key 90 connects ground to conductor 91 to effect operation of relay SC. The operation of relay SC lights the white call lamp and the red lamp 30, and closes a circuit for energizing the operating room calling signal 40. A supervisor then goes to the calling DSB operator position and restores the key 90 to normal, thereby releasing relay SC to extinguish the call lamps and deenergize the signal 40.

An outgoing call may be initiated by a DSB board supervisor by having a DSA operator connect one end of a cord to an outgoing jack 70 and extend the call through the other end of the cord to chief operator's desk, information desk, switchman's desk or to a called subscriber line as desired.

What is claimed is:

1. In a telephone system comprising an automatic telephone exchange and a toll switchboard, a supervisory operator circuit, lines from said automatic exchange to said operator circuit, a toll operator position at said toll switchboard, an outgoing truck jack at said position, a trunk line from said jack to said operator circuit, a telephone set, plug and jack means for connecting said set to said operator circuit to answer calls, means in said circuit comprising an individual relay for each said line for marking said trunk jack busy, means in said automatic exchange for seizing either one of said lines and for operating said relay of the seized line and relay means in said circuit controlled by said individual relays and rendered operative by connection of said supervisor set to said operator circuit for extending calls incoming over said lines from the automatic exchange to the telephone set in the order in which the lines are seized.

2. In a telephone system, a supervisory operator circuit, automatic switching means, first and second lines incoming to said circuit seizable by said switching means, an operator posiiton, a third line incoming to said circuit seizable at said position, a call signal individual to each of said first and second lines, a call signal common to said lines, means individual to each of said first and second lines operable upon seizure of the associated line for energizing the associated individual call signal and the common call signal, means operable upon seizure of said third line for energizing said common call signal, a telephone set and means for connecting said set to said circuit to answer an incoming call, and control means in said supervisory operator circuit comprising relay means for extending calls simultaneously awaiting answer on said first and second lines to said telephone set in the order in which said lines are seized and comprising relay means for extending a call incoming over said third line to said supervisory circuit only when no other calls are awaiting answer on said first and second lines or when the call awaiting answer on said third line is received before the calls awaiting answer on said first and second lines.

3. In a telephone system, a dial office, dial system's B operator positions, dial system's A operator positions, a supervisor circuit for said B operator positions, a telephone set, means for connecting said set to said circuit to answer calls incoming to said circuit, two lines incoming from said dial office to said circuit, a third line incoming from said A operator positions to said circuit, call signal means individual to each of said two lines, call signal means common to said two lines and said third line, means operable responsive to seizure of either of said two lines for energizing the associated individual call signal means and said common signal means, means operable upon seizure of said third line for energizing the common call signal means, and control means rendered operative by connection of said telephone set to said circuit for connecting said lines one at a time to said circuit to answer an incoming call said control means comprising relay means for extending simultaneously waiting calls incoming over said two lines to said telephone set in the order they are received and comprising relay means for extending a call incoming over said third line to said supervisory circuit when no other calls are waiting or when the call awaiting answer on said third line is received before the calls waiting on said two lines.

4. In a telephone system, a supervisory operator circuit, automatic switching means, first and second lines incoming to said circuit seizable by said switching means, an operator position, a third line incoming to said circuit seizable at said position, a call signal individual to each of said first and second lines, a call signal common to said lines, means individual to each of said first and second lines operable upon seizure of the associated line for energizing the associated individual call signal and the common call signal, means operable upon seizure of said third line for energizing said common call signal, a telephone set and means for connecting said set to said circuit to answer an incoming call, first and second control relays, means including front contacts of both of said relays for connecting said first line to said telephone set, means including front contacts of said first relay and back contacts of said second relay for connecting said second line to said telephone set, means including back contacts of said first relay for connecting said third line to said telephone set, means for preventing the operation of either of said relays after said third line is seized, means for operating said first relay when either said first or second line is seized, means for operating said second relay only when said first line is seized, and relay means effective when said first line is seized subsequent to seizure of said second line and both calls are awaiting answer to prevent the operation of said second relay.

RUSSELL B. BUCHANAN.

REFERENCES CITED

The following references are of record in the file of this patent:

UNITED STATES PATENTS

| Number | Name | Date |
|---|---|---|
| 1,509,691 | Richardson | Sept. 23, 1924 |
| 2,314,990 | Kessler | Mar. 30, 1943 |
| 2,352,107 | Kessler | June 20, 1944 |
| 2,427,000 | Hovland | Sept. 9, 1947 |
| 2,467,457 | Balzer | Apr. 19, 1949 |